No. 690,189. Patented Dec. 31, 1901.
P. RYAN.
MACHINE FOR MAKING PLASTER BOARDS.
(Application filed May 4, 1901.)
(No Model.) 6 Sheets—Sheet 1.
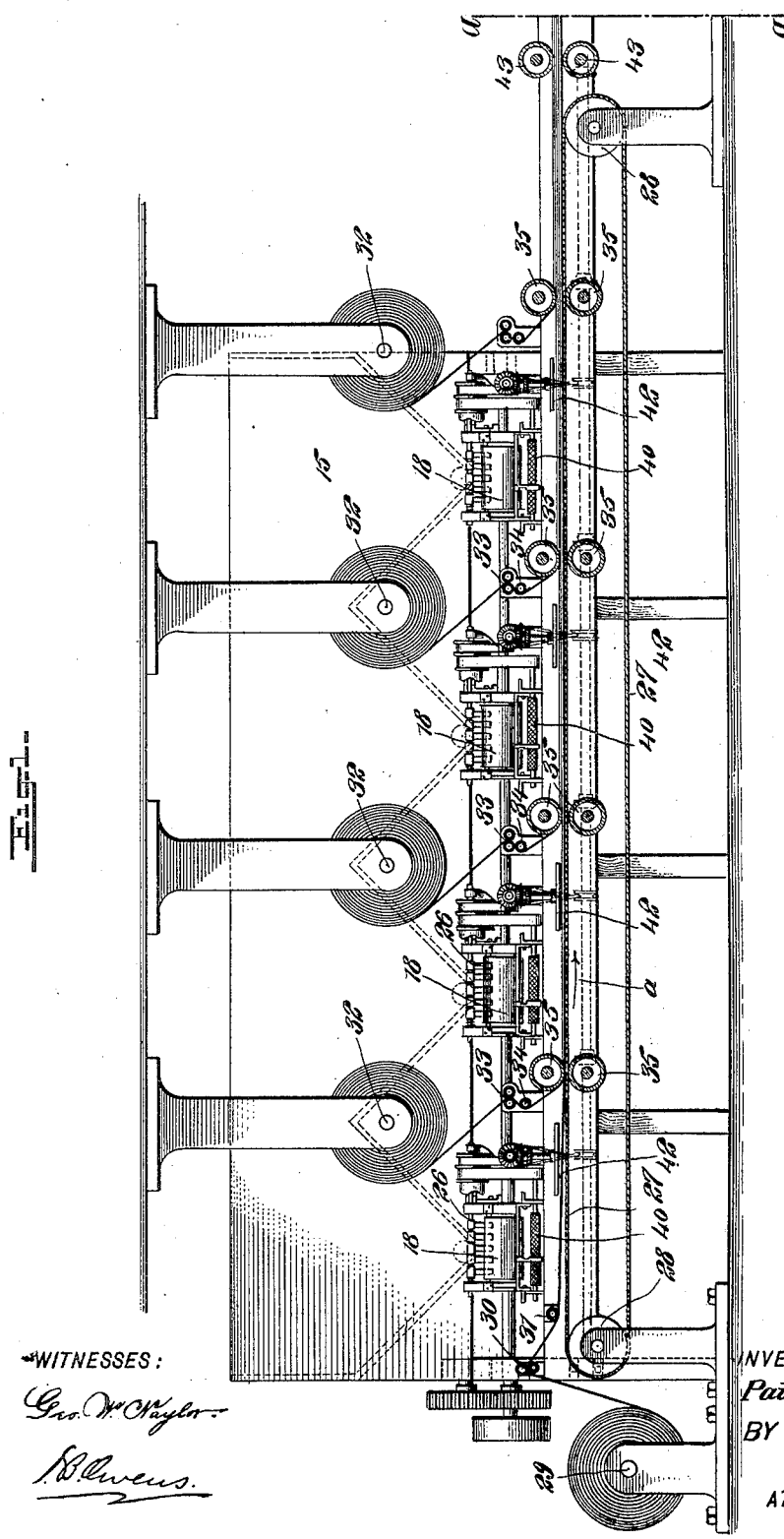
WITNESSES:
INVENTOR
Patrick Ryan
BY
ATTORNEYS No. 690,189.  
P. RYAN.  
MACHINE FOR MAKING PLASTER BOARDS.  
(Application filed May 4, 1901.)  
(No Model.)  
Patented Dec. 31, 1901.  
6 Sheets—Sheet 2.

INVENTOR  
Patrick Ryan  
BY  
ATTORNEYS

WITNESSES:

No. 690,189. Patented Dec. 31, 1901.
P. RYAN.
MACHINE FOR MAKING PLASTER BOARDS.
(Application filed May 4, 1901.)
(No Model.) 6 Sheets—Sheet 3.
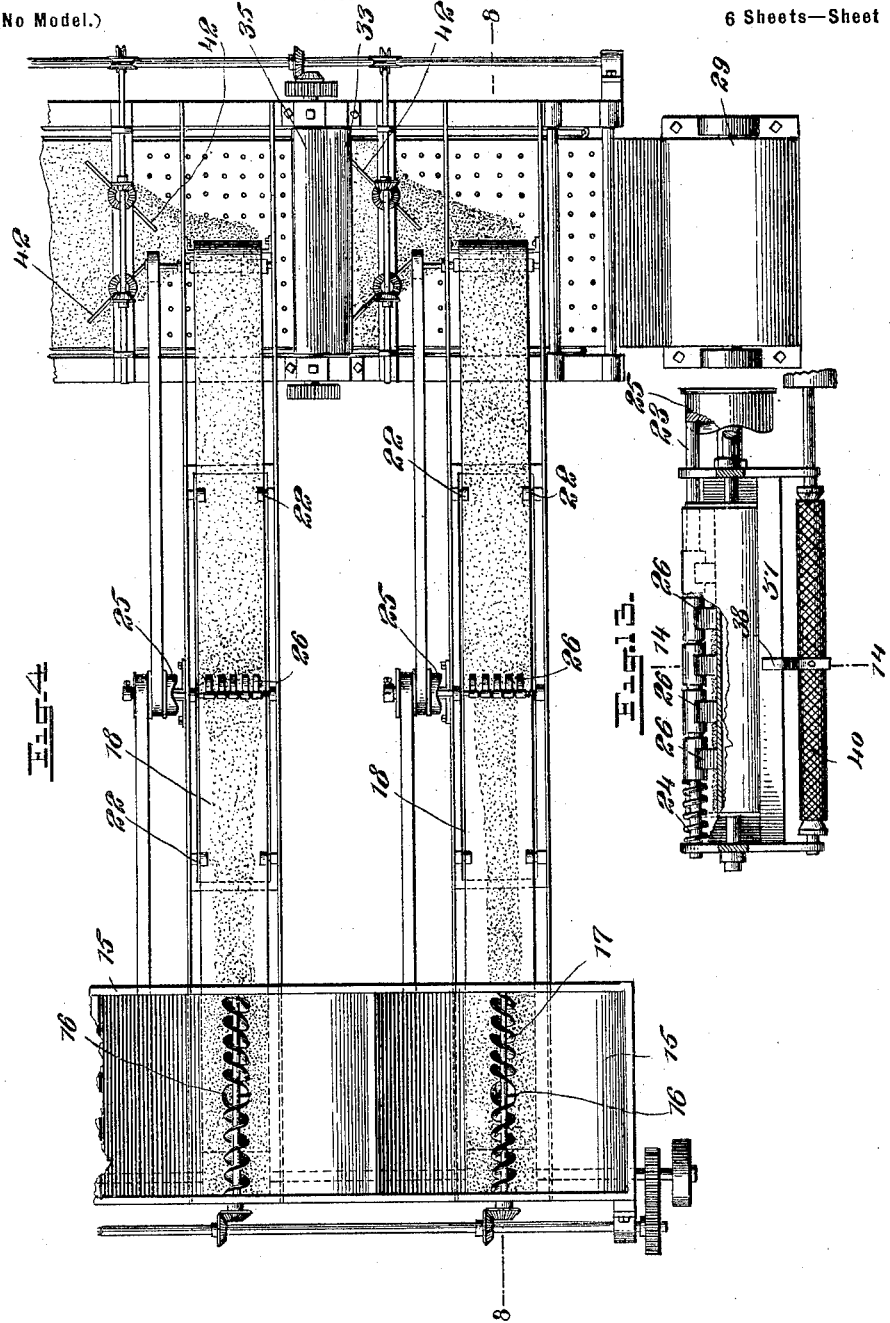
WITNESSES:
INVENTOR
Patrick Ryan
BY
ATTORNEYS No. 690,189. Patented Dec. 31, 1901.
P. RYAN.
MACHINE FOR MAKING PLASTER BOARDS.
(Application filed May 4, 1901.)
(No Model.) 6 Sheets—Sheet 4.
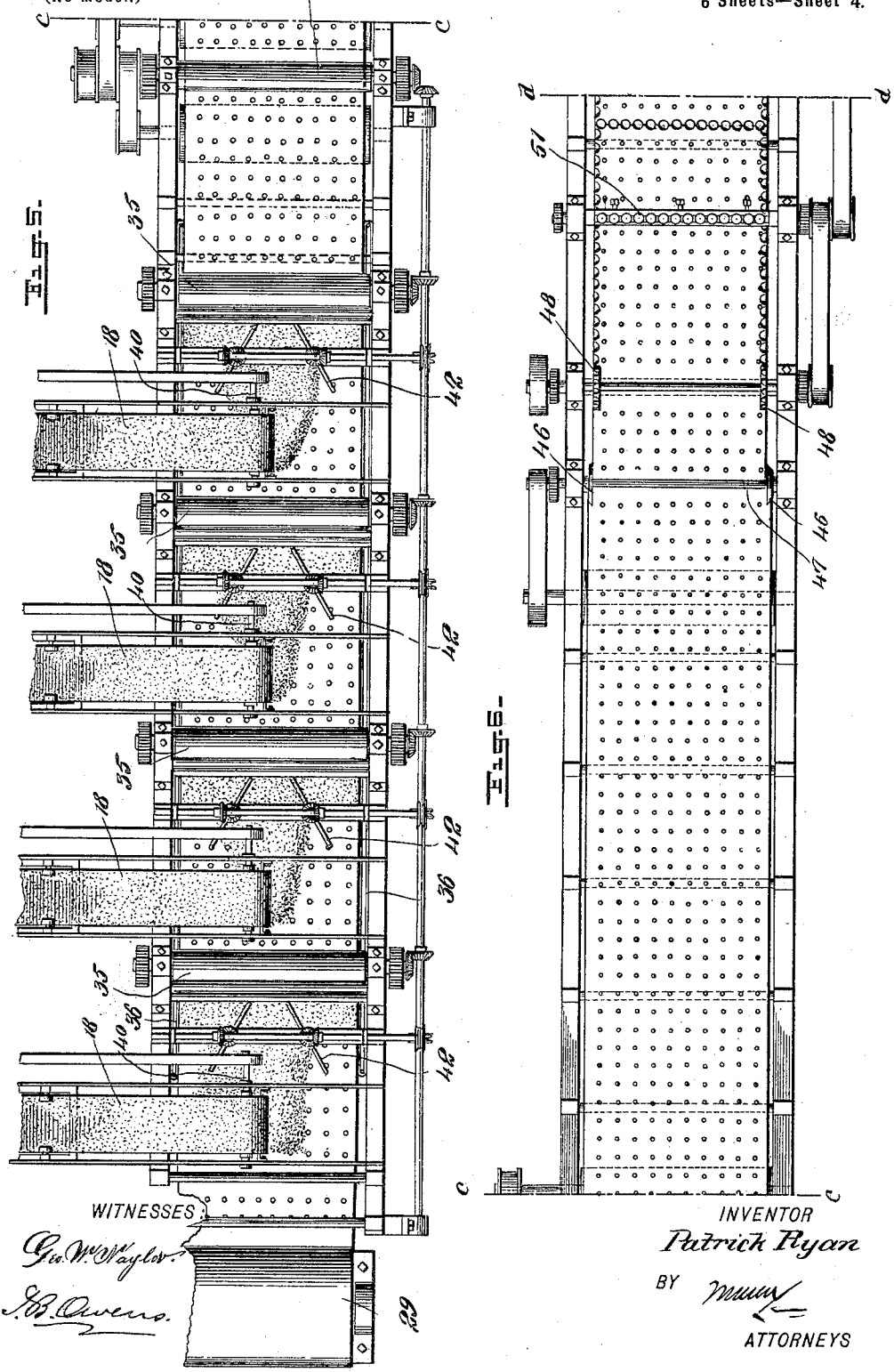
WITNESSES
INVENTOR
Patrick Ryan
BY
ATTORNEYS No. 690,189. Patented Dec. 31, 1901.
P. RYAN.
MACHINE FOR MAKING PLASTER BOARDS.
(Application filed May 4, 1901.)
(No Model.) 6 Sheets—Sheet 5.
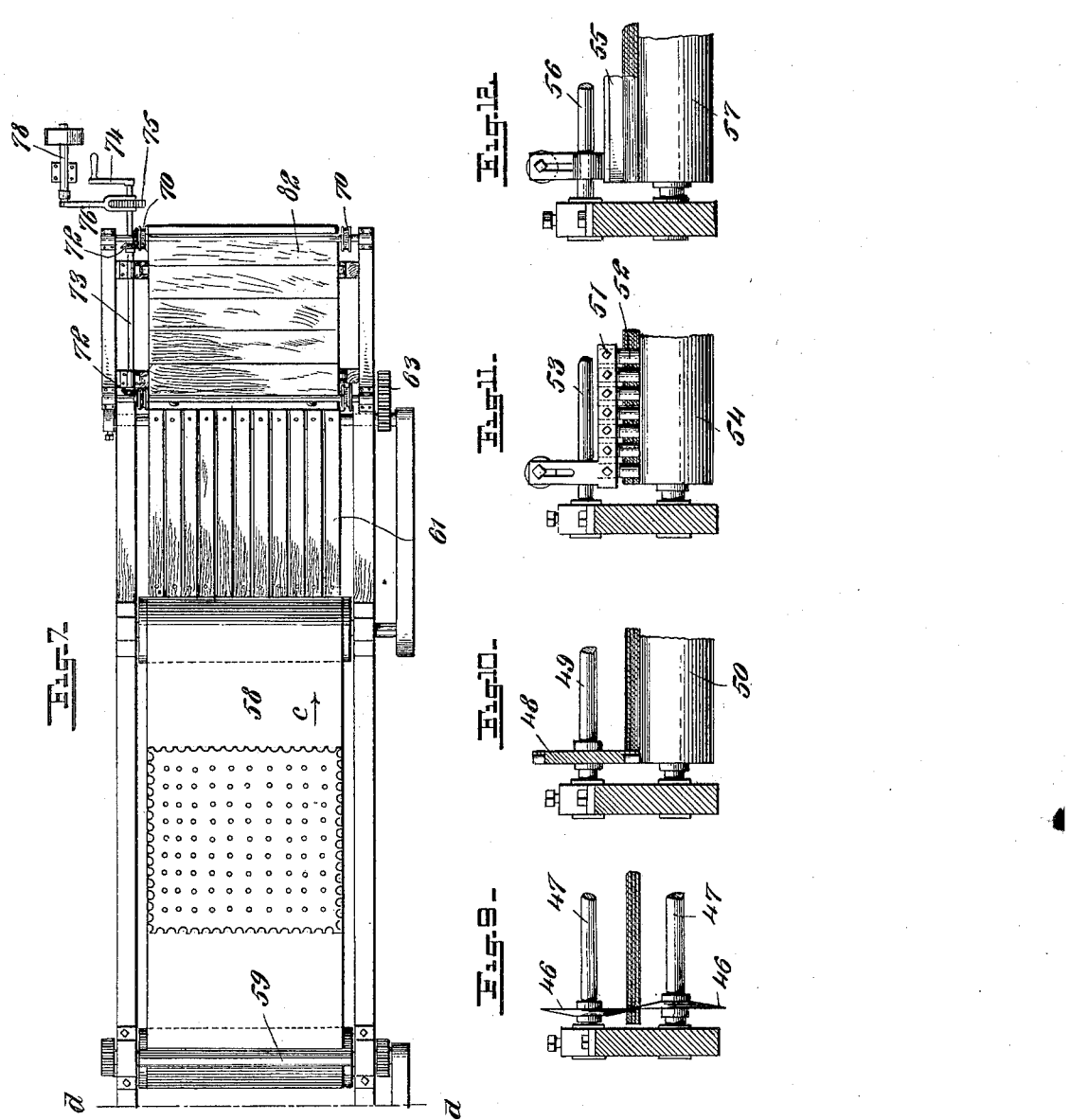
WITNESSES:
INVENTOR
Patrick Ryan
BY
ATTORNEYS No. 690,189. Patented Dec. 31, 1901.
P. RYAN.
MACHINE FOR MAKING PLASTER BOARDS.
(Application filed May 4, 1901.)
(No Model.) 6 Sheets—Sheet 6.
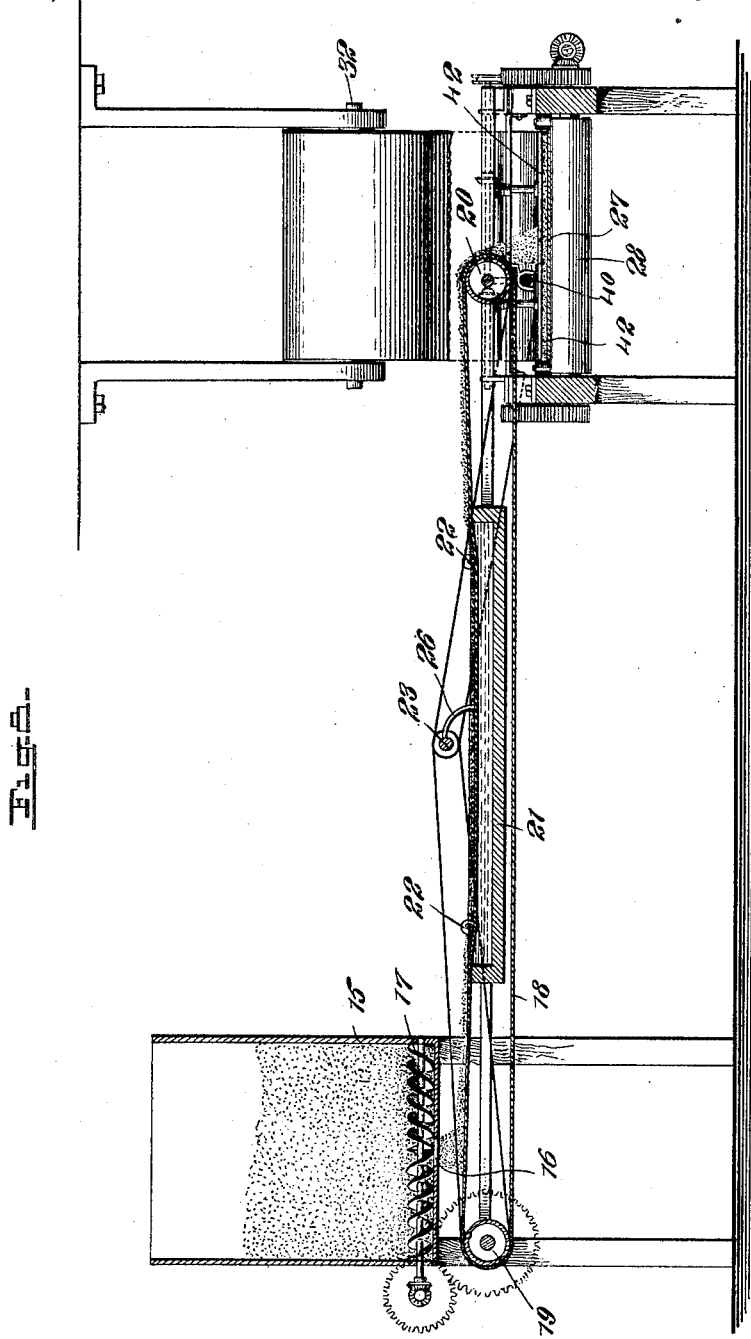
WITNESSES:
INVENTOR
Patrick Ryan
BY
ATTORNEYS
THE NORRIS PETERS CO., PHOTO-LITHO., WASHINGTON, D. C.

UNITED STATES PATENT OFFICE.

PATRICK RYAN, OF NEW YORK, N. Y.

MACHINE FOR MAKING PLASTER-BOARDS.

SPECIFICATION forming part of Letters Patent No. 690,189, dated December 31, 1901.

Application filed May 4, 1901. Serial No. 58,742. (No model.)

*To all whom it may concern:*

Be it known that I, PATRICK RYAN, a citizen of the United States, and a resident of the city of New York, borough of Manhattan, in the county and State of New York, have invented a new and Improved Machine for Making Plaster-Boards, of which the following is a full, clear, and exact description.

This invention relates to a machine for forming fireproof boards for use in buildings, the boards being produced from alternate layers of a suitable fabric and a plastic material, such as ordinary plaster.

The invention constitutes an improvement over that patented by me July 17, 1900, No. 654,024.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a partial longitudinal section of the machine. Fig. 2 is a partial longitudinal section of the machine, showing the section next contiguous to that shown in Fig. 1, the lines $a\ a$ in Figs. 1 and 2 being the points of juncture. Fig. 3 is a partial longitudinal section of the machine, showing the discharge end thereof, the part in Fig. 3 being joined to the part in Fig. 2 at the lines $b\ b$ of said views. Fig. 4 is an enlarged plan view of the front end of the machine. Fig. 5 is a plan view of the section of the machine shown in Fig. 1. Fig. 6 is a plan view of the section shown in Fig. 2, Fig. 6 being joined to Fig. 5 at the lines $c\ c$ of such views. Fig. 7 is a plan view of the part of the machine shown in Fig. 3, Fig. 7 being joined to Fig. 6 at the lines $d\ d$ of said views. Fig. 8 is a section on the line 8 8 of Fig. 4. Fig. 9 is a section on the line 9 9 of Fig. 2. Fig. 10 is a section on the line 10 10 of Fig. 2. Fig. 11 is a section on the line 11 11 of Fig. 2. Fig. 12 is a section on the line 12 12 of Fig. 2. Fig. 13 is a fragmentary elevation showing one of the plaster-feeding belts. Fig. 14 is a section on the line 14 14 of Fig. 13, and Fig. 15 is a fragmentary elevational view looking in the direction of the arrow 15 in Fig. 3 and showing the gear for the fly.

In this specification I shall not go into the details of the various frame parts and the gears for driving the mobile elements. These parts are outlined in the drawings, and since they relate to mere matters of shop construction it is not necessary that they be fully described.

As shown in Figs. 4 and 8, the dry plaster is first placed in a hopper 15, which may be divided into a number of separate compartments or which may be merely one hopper, with the zigzag bottom indicated by dotted lines in Fig. 1. This hopper is formed with a number of outlets 16. According to the construction shown these are four in number. Arranged over each outlet is a conveyer-screw 17, which is provided with right and left hand threads feeding the plaster to the respective openings. From the openings 16 the plaster falls upon a number of transverse belts 18, carried on suitable drums 19 and 20. These belts pass transversely from the hopper 15, and the upper run of each belt is depressed into a water-tank 21 by idler-rolls 22. (See Figs. 4 and 8.) The plaster lying on the belts 18 is thus submerged in the water of the troughs or pans 21 and is wetted thereby. For the purpose of agitating the plaster during the wetting operation and insuring that this operation is thoroughly performed I provide over each pan or trough 21 a transverse shaft 23, suitably mounted in the framing of the machine. This shaft 23 is pressed in one direction by an expansive spring 24, coiled around it, (see Fig. 13,) and in the other direction it is driven by a crown-cam 25. On the shaft 23 are arranged a number of agitating-fingers 26, which are moved by the cam 25 back and forth transversely across the corresponding belt 18. The cam 25 is mounted to rotate and is driven by belts or other suitable gear, as illustrated. These agitators 26, working in the manner explained, thoroughly break up the plaster and insure the complete wetting thereof. They also serve to spread the plaster out upon the belt 18, on which it passes from the water-pans in the manner indicated best in Fig. 4.

The belts or aprons 18 lead to an apron 27, which extends longitudinally with the machine and is carried on drums 28, suitably mounted and driven to drive the belt or apron 27 in the direction of the arrow $a$ in Fig. 1. Supported at the front end of the machine (see Figs. 1 and 5) is a reel 29, carrying a web of the fabric used in the construction of the board. This fabric may be of any suitable sort. For most work it is preferable to use wool fiber fabric, such as is commonly employed in the building trades. From the reel 29 this fabric passes perforating-rolls 30, arranged at the front end of the apron 27, and thence under a guide-roll 31, which leads the web of paper or fabric down immediately over the apron 27. The fabric passes from the perforator 30 over the apron 27 and receives the plaster from the first belt 18—that is to say, the leftwardmost belt in Fig. 1. Arranged over the machine (see Fig. 1) are four reels 32, suitably supported and carrying four webs of fabric similar to the fabric carried by the reel 29. The fabric passes from the reels 32 downward through perforators 33 and under guide-rollers 34, the fabrics passing each between a pair of belts or aprons 18. It therefore will be seen that I provide five webs of fabric and four aprons for feeding the plaster, so that plaster is placed upon the upper side of four of the webs of fabric, thus forming the plaster-board of alternate layers of fabric and plaster, the top and bottom faces of the board being covered with a fabric web. Arranged immediately rearward of the respective aprons 18 are pairs of presser-rolls 35, which are suitably mounted in position transverse to the apron 27 and lying one above and one below the top run of this apron. These rolls 35 are suitably driven, and the webs of fabric from the reels 32 pass, respectively, between the members of the pairs of presser-rollers, so that as each addition is made to the plaster-board the web or fabric added immediately passes through the presser-rolls, and the whole structure is pressed firmly together, forcing the plaster thoroughly into the perforations formed in the webs of fabric. As shown best in Fig. 5, I provide at a side edge of the apron 27 a guide-apron 36, which runs along the edges of the plaster-board during the time of its assemblage and which prevents the plaster from being squeezed out of the side edges of the board, the guide-aprons 36 engaging the side edges of the plaster-board and causing them to be formed true.

As the wet plaster is delivered from the aprons or belts 18 it is removed therefrom by scrapers 37. (Shown best in Figs. 13 and 14.) These scrapers lie directly under the drums 20, which lie over the apron 27, and are suitably supported from the framing of the machine, so that as the aprons 27 turn past the scrapers the latter thoroughly remove from the aprons all of the plaster which might otherwise adhere thereto. Owing to the gummy nature of the plaster it is necessary to take special precautions against clogging the parts of the machine, and for avoiding this clogging of the scrapers 37 I provide cleaning-fingers 38, which are one for each scraper and arranged to play over the faces thereof, as shown in the figures mentioned above, (Figs. 13 and 14.) These cleaning-fingers 38 are sustained to move transversely of the aprons 18 by means of transverse rods 39, suitably mounted on the framing of the machine, and for driving the scraping-fingers I provide right and left hand screws 40, mounted transversely in the framing of the machine and engaged by the forked portions 41 of the scraping-fingers. The screws 40 are revolubly driven by suitable gearing, as illustrated, and owing to the well-known action of these mutilated screws 40 the cleaning-fingers 38 will be caused to move continuously back and forth across the scrapers 37. As the plaster falls from the belts 18 onto the webs of fabrics it is spread out evenly over the webs by means of spreaders 42. These spreaders are in the form of horizontally-disposed rods arranged to be revolubly driven over the faces and in the plane of the webs of the fabric. The scrapers are carried on vertical spindles suitably mounted in the framing of the machine and driven by gearing of any convenient sort—for example, that indicated in the drawings. As the plaster-board is thus formed and carried off of the apron 27 it passes between two feeding-rolls 43, which are arranged one above and one below the board and suitably mounted in the frame. These rolls are driven to feed the board forwardly and are best illustrated in Fig. 1. From the rolls 43 the board passes upon an apron 44. (Illustrated best in Fig. 2.) This apron is mounted in the framing of the machine and driven continuously in the direction of the arrow $b$ in Fig. 2. As the board passes over this apron the plaster is given time to set, and thus the board assumes its rigid form. Transverse idler-rollers 45 are mounted in the frame under the top run of the belt or apron 44 to sustain this run in a true horizontal plane, and thus form the board perfectly true as the plaster sets. From the apron 44 the board passes between pairs of circular knives 46. (See Figs. 2 and 9.) These knives are arranged in two pairs, one at each edge of the plaster-board, and in acting on the board they trim off the side edges thereof to form them true and regular. The shafts 47, carrying the knives 46, (see Fig. 9,) are suitably mounted in the framing of the machine and driven by gearing, as illustrated best in Fig. 6. From the knives 46 the board passes to circular scalloping-knives 48, which are two in number, one at each edge of the board and arranged on a shaft 49, passing over the plaster-board. Working with the scalloping-knives 48 is a roll 50, against which the knives bear. These knives are revolubly driven as the plaster-board passes under them, and they act to scallop the edges of the board, as indicated in Fig. 6. From the scalloping-knives 48 the board passes to a rotary transverse perforator 51. This perforator, as best shown in Fig. 11, consists in a frame-bar carrying a number of punches 52. The frame-bar is carried on a shaft 53, suitably mounted in the framing and geared with the other parts to move in time therewith. The perforator 51 works with a roll 54 arranged beneath it, (see Figs. 2 and 11,) and as the perforator turns around its shaft it periodically engages the plaster-board and forms transverse lines of perforations therein at equidistant points. (See Fig. 6.) The distance between these perforations depends, of course, upon the speed of the movement of the belt and the perforator and may be regulated at will. From the perforator 51 the board is fed to a rotary knife 55. (See Figs. 2 and 12.) This knife is carried on a shaft 56, suitably mounted in the frame and revolubly driven. The knife 55 works with a roll 57 placed beneath the plaster-board, and this knife is timed to act with the perforator 51, so that each cut of the knife is made directly in a line of perforations formed by the perforator 51. The result, therefore, is the formation of a number of rectangular plaster-boards, all of the edges of which are scalloped, as shown in Fig. 7, it being understood that the knife 55, cutting through the lines of perforations formed by the perforator 51, leaves the board with scalloped edges. Between the rear end of the apron 44 and to a point immediately beyond the knife 55 the board is not carried on an apron, but is guided by the various devices shown in Figs. 9 to 12. The plaster at this time is set completely, and the board is sufficiently rigid to sustain itself.

As the sections of the plaster-board are projected rearward from the knife 55 they pass onto the front end of an apron 58 and under a drawing-roll 59, which is revolubly driven, so as to draw the sections of the plaster-board onto the apron. A transverse idler-roll 60 may be provided for sustaining the sections of the plaster-board as they pass between the knife 55 and roll 59. The belt or apron 58 is driven continuously in the direction of the arrow c in Figs. 3 and 7, and the speed of this belt should be greater than the speed of the belts 44 and 27, so that the separate sections of plaster-board will be readily carried toward the end of the machine. The apron 58 delivers the plaster-boards to a fly 61, which throws the boards off onto a truck 82, carried on an elevator, which will be hereinafter described. The fly 61 is mounted to swing throughout a half-circle around the axis of a shaft 62, on which is carried a toothed sector 63, in mesh with a similar gear 64, arranged below it and fastened on a shaft 65, parallel with the shaft 62. This shaft 65 is driven with a continuous rotary movement. As shown in Figs. 3 and 15, the shaft 62, carrying the fly, is provided with toes 80, which are fast thereto, and when the fly is thrown over the car 82 these toes 80 strike spring-buffers 81 on a horizontal bar 83, arranged below the shaft 62.

84 indicates a weighted arm which is attached to the shaft 62 and which when the fly 61 lies in the position shown in Fig. 3 projects downward from the shaft. (See Fig. 15.) As the gear 64 turns into mesh with the gear 63, it throws the fly over the car 82, and then the arms or toes 80 strike the spring-buffers 81. When this takes place, the gear 64 runs off the gear 63 and the springs 81 start the fly back. This action is then taken up by the arm 84, which completes the return of the fly.

67 indicates an elevator-frame, in which is arranged a platform 68, hung on cables 69, passing over sheaves 70 at the top of the frame 67 and over drums 71 at the lower part thereof. These drums 71 are carried in pairs on horizontally-disposed axial shafts and are connected by miter-gearing 72 (see Fig. 7) with a drive-shaft 73. (See Figs. 3 and 7.) This drive-shaft is provided with a hand-crank 74 for manual operation, and fastened to the shaft 73 is a ratchet-wheel 75, with which works a fork 76, carrying a pawl. This fork is rockably driven by a rod 77, connected with a crank-shaft 78, arranged at the top of the elevator-frame and driven revolubly by any suitable gear. As the shaft 78 turns it imparts a step-by-step movement to the shaft 73, and consequently to the drums 71, and this movement is arranged to steadily lower the platform 68. The shaft 78 is driven in time with the movement of the fly 61, so that each time a plaster-board is placed on the truck 62 the platform 68 is lowered a distance equal to the thickness of this board. This operation is kept up until the platform 68 reaches the bottom of the elevator frame or shaft, and then the operation of the machine should be arrested, so that the truck 82 may be wheeled off of the platform 68 and emptied of its load. The truck is then replaced on the platform, and by manually driving the shaft 73 through the medium of the crank 74 the platform 68 may be again elevated to the position shown in Fig. 3 and the operation of the machine resumed.

Having thus described my invention, I claim as new and desire to secure by Letters Patent—

1. The combination of a water-trough, an apron passing through the same and carrying material therein to wet it, and an agitator driven transversely across the apron within the trough.

2. The combination of an apron serving to carry plastic material, a scraper engaging the apron to clean it, and a cleaning-finger driven across the face of the scraper, for the purpose specified.

3. The combination of an apron serving to carry plastic material, a scraper arranged to engage the apron to clean it, a cleaning-finger movable across the face of the scraper, and a right and left hand threaded or mutilated screw engaging the cleaning-finger, the screw being revolubly driven to impart a back-and-forth movement to the cleaning-finger.

4. In a machine for making plaster-boards, the combination of a hopper for containing the dry plaster, an apron carrying the plaster from the hopper, a water-pan through which the apron passes to wet the plaster, an agitator driven over the apron within the trough, and means at the discharge end of the apron for applying the wetted plaster to a fabric web.

5. The combination of a fly, mutilated gears for driving the fly in one direction, a spring for starting its return, and a weight for completing the return of the fly.

6. The combination of a fly, means for driving the fly in one direction, a spring for starting the return of the fly, and a weight for completing said return.

7. In a machine for making plaster-boards, the combination of a hopper for containing the drying plaster, an apron passing therefrom, a water pan or trough through which the apron passes to wet the plaster, a second apron moving transversely to the first apron and adapted to carry webs of fabric in which the wetted plaster is deposited, and a spreader working over the face of the second apron to spread the material on the fabric web.

In testimony whereof I have signed my name to this specification in the presence of two subscribing witnesses.

PATRICK RYAN.

Witnesses:
I. B. OWENS,
JNO. M. RITTER.